United States Patent
Oroskar et al.

(10) Patent No.: US 7,022,306 B1
(45) Date of Patent: Apr. 4, 2006

(54) PROCESS FOR THE PRODUCTION OF HYDROGEN

(75) Inventors: Anil R. Oroskar, Oakbrook, IL (US); Kurt M. Vanden Bussche, Lake in the Hills, IL (US); Laszlo T. Nemeth, Palatine, IL (US); Christine M. Rayner, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 326 days.

(21) Appl. No.: 10/395,319

(22) Filed: Mar. 21, 2003

(51) Int. Cl.
*C01B 3/02* (2006.01)
*C01B 3/04* (2006.01)
*C01B 3/06* (2006.01)
*C01B 3/08* (2006.01)

(52) U.S. Cl. .............. 423/648.1; 423/658.2; 252/373

(58) Field of Classification Search ........ 252/373; 423/648.1, 658.2
See application file for complete search history.

(56) References Cited

U.S. PATENT DOCUMENTS

| | | | |
|---|---|---|---|
| 6,073,437 A | 6/2000 | Jones | 60/204 |
| 6,299,995 B1 | 10/2001 | Abdo et al. | 429/17 |
| 6,409,939 B1 | 6/2002 | Abdo et al. | 252/373 |
| 6,419,771 B1 | 7/2002 | Lormand | 149/1 |
| 6,436,354 B1 | 8/2002 | Priegnitz et al. | 422/198 |
| 6,497,856 B1 | 12/2002 | Lomax, Jr. et al. | 423/651 |
| 6,620,537 B1 * | 9/2003 | Struthers et al. | 429/19 |

\* cited by examiner

*Primary Examiner*—Colleen P. Cooke
(74) *Attorney, Agent, or Firm*—John G. Tolomei; Frank S. Molinaro; Arthur E. Gooding (57) ABSTRACT

A process and apparatus are disclosed for the generation of hydrogen from hydrogen rich compounds. The process uses hydrogen peroxide as an oxidizer with a hydrogen rich compound forming a mixture such that when the mixture is exposed to a catalyst forming a hydrogen rich gas.

38 Claims, 3 Drawing Sheets

PROCESS FOR THE PRODUCTION OF HYDROGEN

FIELD OF THE INVENTION

This invention relates to fuels and processes for the production of hydrogen. In particular, this invention relates to a fuel mixture, which when used in conjunction with a catalyst generates a hydrogen rich gas through autothermal reforming.

BACKGROUND OF THE INVENTION

The production of hydrogen ($H_2$) is a very important process. It is used in oil refineries, the production of fine chemicals, and energy applications. One method of producing hydrogen is the steam reforming process, wherein hydrocarbons are catalytically reacted with steam at high temperature to produce hydrogen and oxides of carbon. This is the most common method of producing hydrogen, or hydrogen and carbon oxide mixtures. Currently, natural gas predominates as a feedstock over other hydrocarbons, e.g., naphtha, LPG, refinery gases. The catalytic steam reforming process in tubular furnaces was invented by BASF, and was used in the United States in the early 1930s. The principal purposes were to produce hydrogen from natural gas for hydrogenation purposes and to synthesize ammonia. The process was initially carried out at low pressures (0.4–1 MPa) and temperatures close to 800° C., and subsequently higher pressures (up to 4 MPa) and temperatures (up to 950° C.) are used today.

A special type of steam reforming is autothermal reforming, and is also called catalytic partial oxidation. This process differs from catalytic steam reforming in that the heat is supplied by the partial internal combustion of the feedstock with oxygen or air, and not supplied from an external source.

Modification of the process, using air as the oxidizer was developed for ammonia synthesis, and recently, oxygen based gasification has been introduced into methanol synthesis.

SUMMARY OF THE INVENTION

The present invention is a process for generating hydrogen for use in chemical processes, or for use as a fuel for fuel cells. The invention comprises mixing an oxygenate and an oxidizer in the presence of an initiator. In one embodiment, the oxygenate is selected from alcohols, diols, triols, ethers, ketones, diketones, esters, carbonates, dicarbonates, oxalates, sugars, and mixtures thereof. In another embodiment the oxidizer is selected from hydrogen peroxide, organic peroxides, hydroperoxides, and mixtures thereof. In a preferred embodiment, the initiator comprises a catalyst.

In a preferred embodiment, the process comprises flowing a mixture of an oxygenate and hydrogen peroxide over an initiator. The preferred initiator is a catalyst mixture that comprises a first catalyst for decomposing the hydrogen peroxide and a second catalyst for catalytic autothermal reforming of the oxygenate.

An aspect of the present invention is an apparatus for generating hydrogen from a fuel mixture of an oxygenate and an oxidizer. In one embodiment, the apparatus comprises a housing for holding a catalyst bed and having an inlet for admitting the fuel and an outlet for directing a product stream rich in hydrogen gas. In one embodiment the catalyst bed comprises a mixture of catalysts with a first catalyst for decomposing the oxidizer and a second catalyst for reforming the oxygenate.

Another aspect of the invention is a liquid fuel for generating hydrogen. The liquid fuel comprises an organic compound and an oxidizer. In one embodiment the organic compound is an oxygenate and preferably an alcohol and the oxidizer is hydrogen peroxide.

Other objects, advantages and applications of the present invention will become apparent to those skilled in the art after the following detailed description

DETAILED DESCRIPTION OF THE INVENTION

Hydrogen production is important for chemical processes and energy applications. A combination of catalytic steam reforming and autothermal reforming is an efficient means for converting a hydrocarbon to a hydrogen ($H_2$) rich gas. A process and fuel that utilizes autothermal reforming and produces hydrogen on demand can be useful for intermittent processes.

One use for intermittent hydrogen production is for fuel cells, where hydrogen is needed for variable demand. An example of the needs for automotive applications is shown in Table 1.

TABLE 1

| Alternate fuel for automotive applications Automotive Applications - Alternate Fuel | |
|---|---|
| Required Range | 300 miles |
| Average Speed | 50 mph |
| Average Propulsion Power Needed | 14 kW |
| Cell to Wheel Efficiency | 0.81 |
| Density of Storage Means | 0.9 kg/liter |
| $H_2$ Capacity of Storage Means | 7 wt. % $H_2$ |
| Fuel Cell Performance 1 | 0.7 V |
| Fuel Cell Performance 2 | 600 mA/cm$^2$ |
| Overall Energy Required | 373 MeJ |
| Overall Hydrogen Required | 5.5 kg |
| Mass of Storage Means Required | 79 kg |
| Volume of Storage Means Required | 88 liters |
|  | 23 gallons |
| $CO_2$ Emission Reduction Factor | 2.30 |
| Fuel Cost | 1.30$/gallon |
|  | (20¢/lb $H_2O_2$; |
|  | 1.35$/gallon EtOH) |
| Cost per mile to consumer | 0.10$/mile |
| Traditional Fuel Cost per mile | 0.07$/mile |

The present invention is a process and a fuel for generating hydrogen. The process comprises mixing an oxygenate and oxidizer in the presence of an initiator. It is preferable that the oxygenate and oxidizer are liquids, or that a mixture of the oxygenate and oxidizer form a substantially liquid mixture at normal environmental temperatures, i.e., from about −40° C. to about 50° C. or over a portion of this temperature range, especially, from about 0° C. to about 40°

C. When this mixture is brought into contact with an initiator, the oxidizer decomposes and generates heat, oxygen and water. The mixture may be mixed as the mixture is brought into contact with the initiator, or the mixture may be pre-mixed and subsequently brought into contact with the initiator. The resulting heat and water concurrently causes steam reforming of the oxygenate, according to:

$$C_2H_5OH + H_2O \xrightarrow{catalyst} 2CO + 4H_2 \quad \text{(eqn. 1)}$$

An initiator can be any means for starting the decomposition of the oxidizer, and includes, but is not limited to, heat, a chemical additive, and a catalyst. Heat as an initiator can be provided by a heated wire through electrical resistance, or combustion of a portion of the fuels. A chemical additive when mixed with the fuel reacts with the oxidizer to generate heat and oxygen can be an appropriate initiator. An example of a chemical initiator is potassium permanganate ($KMnO_4$). Preferably, the initiator can be a catalyst, wherein the catalyst is one selected to decompose the oxidizer and generate heat and oxygen.

Using thermodynamic data from an HYSYS™, by Hyprotech, Ltd., Calgary Canada, the reaction of ethanol and hydrogen peroxide showed the reaction was preferred to produce carbon monoxide and hydrogen. The results of the reaction are shown in Table 2 for the reaction:

$$C_2H_5OH(g) + H_2O_2(g) \rightarrow 2CO(g) + 3H_2(g) + H_2O(g) \quad \text{(eqn. 2)}$$

TABLE 2

Thermodynamics of ethanol oxidation with hydrogen peroxide

| T C | ΔH Kcal | ΔS Cal/K | ΔG Kcal | K | Log (K) |
|---|---|---|---|---|---|
| 0.000 | −22.421 | 108.483 | −52.053 | 4.482E+041 | 41.652 |
| 100.000 | −20.837 | 113.457 | −63.174 | 1.008E+037 | 37.003 |
| 200.000 | −19.698 | 116.182 | −74.670 | 3.113E+034 | 34.493 |
| 300.000 | −18.941 | 117.644 | −86.369 | 8.637E+032 | 32.936 |
| 400.000 | −18.493 | 118.371 | −98.174 | 7.526E+031 | 31.877 |
| 500.000 | −18.265 | 118.689 | −110.030 | 1.274E+031 | 31.105 |
| 600.000 | −18.187 | 118.786 | −121.905 | 3.276E+030 | 30.515 |
| 700.000 | −18.230 | 118.741 | −133.782 | 1.115E+030 | 30.047 |
| 800.000 | −18.375 | 118.599 | −145.650 | 4.617E+029 | 29.664 |
| 900.000 | −18.609 | 118.391 | −157.500 | 2.206E+029 | 29.344 |
| 1000.000 | −18.922 | 118.135 | −169.326 | 1.172E+029 | 29.069 |

| Formula | Molecular wt. g/mol | Conc. wt-% | Amount mol | Amount g | Volume l or ml |
|---|---|---|---|---|---|
| $C_2H_5OH(g)$ | 46.069 | 57.526 | 1.000 | 46.069 | 22.414 |
| $H_2O_2(g)$ | 34.015 | 42.474 | 1.000 | 34.015 | 22.414 |

| | g/mol | wt-% | mol | g | l or ml |
|---|---|---|---|---|---|
| $CO(g)$ | 28.010 | 69.953 | 2.000 | 56.021 | 44.827 |
| $H_2(g)$ | 2.016 | 7.551 | 3.000 | 6.047 | 67.241 |
| $H_2O(g)$ | 18.015 | 22.496 | 1.000 | 18.015 | 22.414 |

This indicates a significant energy release in the production of hydrogen when using hydrogen peroxide as an oxidizer. Experiments were conducted in lab scale quantities to verify that sufficient heat is generated to reform a mixture of alcohol and water without adding additional heat.

EXAMPLE 1

Pure ethanol was mixed with 30% aqueous hydrogen peroxide under atmospheric conditions. The mixture was oxidized using the catalyst $MnO_2$. The test consisted of mixing 2 gm of pure ethanol with 2 gm of 30% hydrogen peroxide. The reaction was very exothermic, and a large amount of gas was produced. The gas product composition comprised about 30 volume percent of $H_2$, about 22 volume percent of $CO_2$, and a small amount of CO; and the liquid product composition included ethoxy-acetic acid, and 2-propanol based on gas chromatography-mass spectroscopy (GC-MS).

Figure 1:
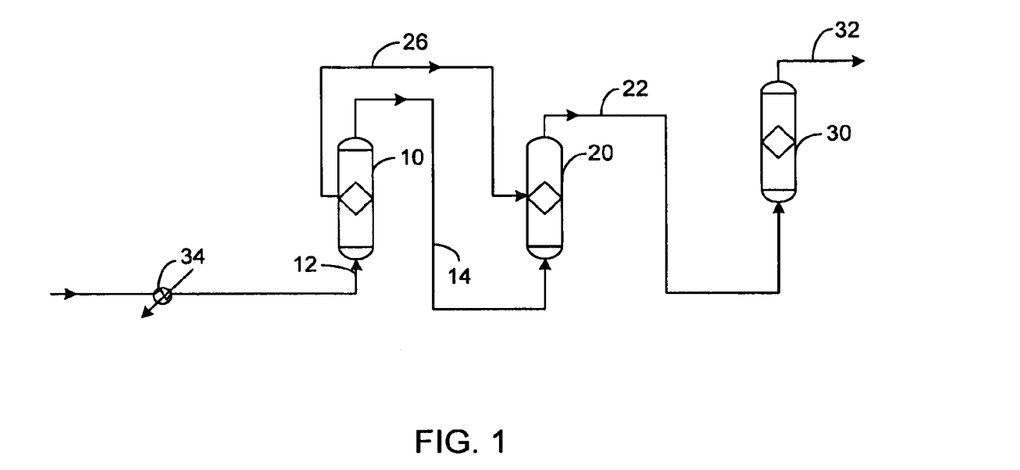
FIG. 1 is a schematic of the process for generating a hydrogen rich gas.

The process is as shown in FIG. 1. A fuel comprising, for example, a mixture of ethanol and hydrogen peroxide enters a reactor 10 through an inlet port 12. Reactor 10 comprises a catalyst bed holding a decomposition catalyst for decomposing the hydrogen peroxide. The operating conditions are at ambient pressure and at a temperature from about −20° C. to about 50° C. The decomposition reaction decomposes the hydrogen peroxide and generates heat and a first product stream 14, including water and oxygen. The product streams 14 is directed to a second reactor 20 comprising a second catalyst bed holding a reforming catalyst. The reforming catalyst is chosen to reform the ethanol and water to form a second product stream 22, which includes a gas comprising hydrogen, carbon dioxide, and carbon monoxide. The reforming reaction is endothermic and requires the addition of heat. The heat from the decomposition reaction is transferred to the second catalyst bed via an appropriate heat transfer means 26. The second reactor 20 is operated at ambient pressure and at a temperature between about 200° C. and about 1100° C.

Optionally, the second product stream 22 is directed to a third reactor 30 comprising a third catalyst bed. The third catalyst bed holds a water gas shift (WGS) catalyst for performing the water gas shift reaction. The WGS reactor is operated at ambient pressure and at temperatures between about 180° C. and about 300° C. This produces additional hydrogen while converting carbon monoxide to carbon dioxide in a third product stream 32.

The process also provides for optional preheating of the fuel to the decomposition catalyst with a heat exchanger 34 when excess heat is generated in the process.

The process requires an oxidizer that is a compound that gives up its oxygen readily, and generates heat in the process of giving up its oxygen for further chemical reaction. Oxidizers include, but are not limited to, hydrogen peroxide, organic peroxides, hydroperoxides, and mixtures thereof. Preferably, the oxidizer is a liquid, or is readily soluble in a liquid to form a liquid phase at normal environmental conditions. A preferred oxidizer is hydrogen peroxide, or hydrogen peroxide in water. When the hydrogen peroxide is in water, it is preferred that the aqueous hydrogen peroxide concentration be less than 90 weight percent, with a more preferred hydrogen peroxide concentration of less than 50 weight percent.

The determination of an appropriate mixture for the fuel includes whether there is adequate hydrogen and adequate oxygen in the mixture. However, an initial look at possible fuel mixtures can be analyzed from an overall composition. Specifically, looking at the ratios of hydrogen (H), oxygen (O), and carbon (C). One method is by graphing the positions of fuel compositions on a triangular graph showing the overall compositions of H, O and C. Components of potential fuels and fuels are listed in Table 3 and plotted on FIG. 2 in atomic ratios.

Figure 2:
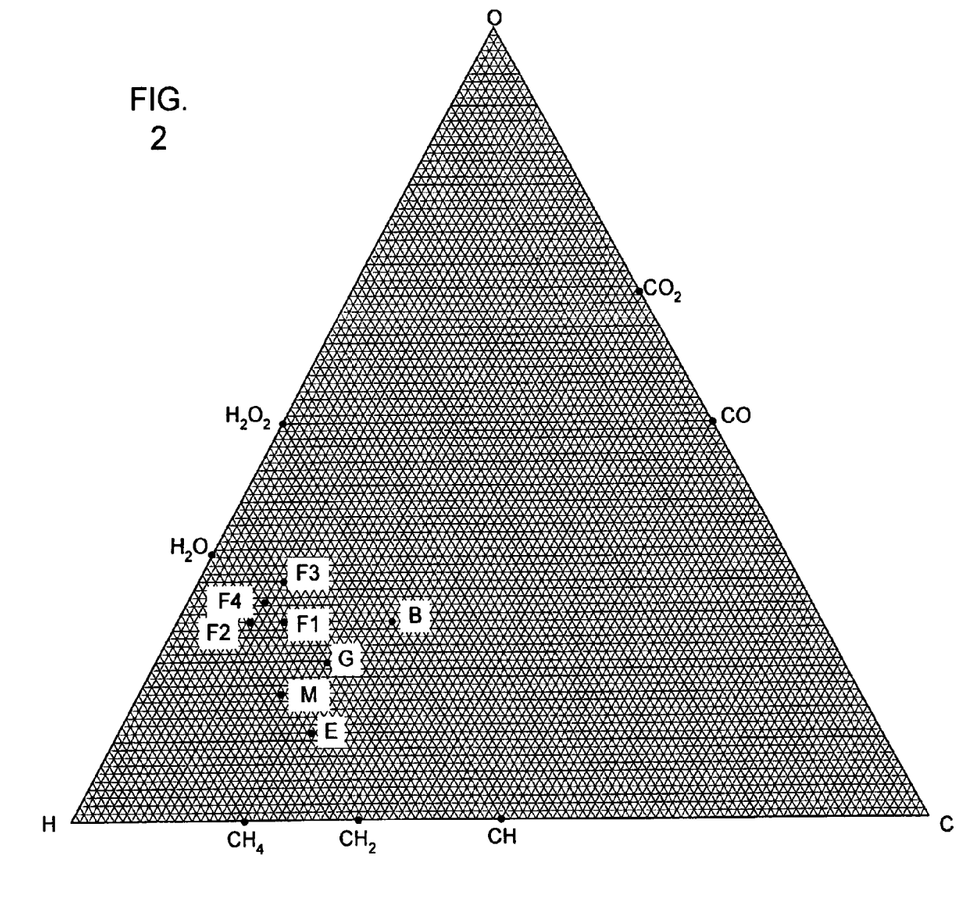
FIG. 2 is a graph depicting the mole fractions of hydrogen and oxygen in desired fuel compositions.

| Fuel or Fuel Compound | Approximate Atomic Ratio of | | | Graph Symbol |
|---|---|---|---|---|
| | H | C | O | |
| Biomas | 2 | 1 | 1 | B |
| Ethanol | 3 | 1 | 0.5 | E |
| Methanol | 4 | 1 | 1 | M |
| Glycol | 3 | 1 | 1 | G |
| Fuel 1 | 5 | 1 | 2 | F1 |
| Fuel 2 | 8 | 1 | 3 | F2 |
| Fuel 3 | 6 | 1 | 3 | F3 |
| Fuel 4 | 7 | 1 | 3 | F4 |

Aspects of the compositions are that for increasing oxygen (O) content, activation is lower and therefore reforming temperature is lower; and for increasing hydrogen (H) content more $H_2$ is generated from reforming.

From FIG. 2, a preferred atomic concentration of hydrogen in the mixture of organic compound and oxidizer is in the range of 0.5 atomic fraction to about 0.8 atomic fraction with a more preferred range from about 0.6 atomic fraction to about 0.68 atomic fraction; and a preferred atomic concentration of oxygen in the mixture is from about 0.1 atomic fraction to about 0.5 atomic fraction with a more preferred concentration from about 0.15 atomic fraction to about 0.35 atomic fraction.

The process requires an organic compound. An organic compound of choice is an oxygenate, that is, a hydrocarbon compound that has been altered with the addition of at least one oxygen atom to the hydrocarbon compound. Oxygenates include, but are not limited to, alcohols, diols, triols, ethers, ketones, diketones, esters, carbonates, dicarbonates, oxalates, organic acids, sugars, and mixtures thereof. The oxygenates of choice will be compounds that are generally in a liquid state at normal environmental conditions, or are soluble in a liquid to form a liquid solution at normal environmental conditions. Suitable oxygenates include, but are not limited to, alcohols having 12 or fewer carbons, ketones having 12 or fewer carbons, esters having 12 or fewer carbons, diols having 12 or fewer carbons, triols having 12 or fewer carbons, ethers having 12 or fewer carbons, carbonates having 12 or fewer carbons, dicarbonates having 12 or fewer carbons, oxalates having 12 or fewer carbons, organic acids having 12 or fewer carbons, sugars having 12 carbons or less, and mixtures thereof.

Preferably, the oxygenates are alcohols, including diols and triols, having 8 or less carbons, and ethers having 8 or less carbons. Examples of preferred oxygenates are methanol and ethanol. Other oxygenates that are preferred include propanols, butanols, amyl alcohols, hexanols, dimethyl ether, isopropylether, dimethoxymethane, and sorbitols.

The oxygenate and oxidizer are mixed in the presence of an initiator to generate a hydrogen rich gas. Preferably the initiator is a catalyst. The catalyst can comprise one or more metals selected from calcium (Ca), scandium (Sc), titanium (Ti), vanadium (V), chromium (Cr), manganese (Mn), iron (Fe), cobalt (Co), nickel (Ni), copper (Cu), zinc (Zn), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), barium (Ba), lanthanum (La), hafnium (Hf), tantalum (Ta), tungsten (W), rhenium (Re), osmium (Os), iridium (Ir), platinum (Pt), gold (Au), and mercury (Hg). The catalyst can include oxides of the metal, sulfides and other sulfur compounds of the metal and sols comprising the metal. Preferred catalysts comprise one or more metals from vanadium, iron, cobalt, ruthenium, copper, nickel, manganese, molybdenum, platinum, gold, silver, palladium, rhodium, rhenium, osmium, and iridium, with the more preferred catalyst comprising iron, cobalt, nickel and manganese.

The catalyst can be deposited on a support for increasing the surface area of the catalyst when reacting the mixture of oxygenate and oxidizer. Materials suitable for supports include, but are not limited to, inorganic oxides such as silicas, aluminas, titania, zirconia, yttria, and molecular sieves. Other supports include, but are not limited to, carbon, silicon carbide, diatomaceous earth, and clays.

When mixing the oxygenate and oxidizer, there must be sufficient oxidizer to generate heat sufficient to heat the mixture to a reforming temperature, and there must be sufficient oxygenate to be reformed and generate a hydrogen rich gas having at least 2 weight percent hydrogen as hydrogen gas ($H_2$), and preferably at least 5 weight percent, and more preferably at least 7 weight percent. In order to achieve this hydrogen concentration, the mass ratio of oxygenate to oxidizer needs to be between about 0.25 and about 9.75. Preferably, the mass ratio is between about 0.7 and about 3.

The process autothermally reforms the oxygenate with water and heat from the decomposition of the oxidizer, and in the presence of a catalyst generates a gas that is rich in hydrogen, i.e. a gas having at least 5 weight percent hydrogen ($H_2$). When the oxidizer is hydrogen peroxide, the reaction is very vigorous, and the reaction can be lessened with a moderator or diluent. An appropriate diluent is water, wherein the water is at least partially consumed in the reforming of the oxidizer, as shown in equation 1. The water can be added separately, or be mixed in with the oxidizer by using an aqueous solution of hydrogen peroxide. By using an aqueous solution of hydrogen peroxide, the process uses an oxidizer that is cheaper and easier to produce.

The process can comprise multiple catalysts. A first, or decomposition catalyst can be used for the decomposition of the oxidizer and a second, or reforming catalyst can be used for the autothermal reforming of the oxygenate. The process comprises flowing a mixture of oxygenate and oxidizer over the first catalyst, wherein the first catalyst exothermally decomposes the oxidizer to heat the mixture. The resulting mixture comprises the oxygenate and oxygen, and can also include steam generated from the decomposition of the oxidizer. The mixture subsequently flows over a second catalyst, wherein the heated mixture undergoes reformation to generate a hydrogen rich gas.

The first catalyst for decomposition of the oxidizer is preferably a catalyst comprising at least one metal selected from vanadium, iron, cobalt, ruthenium, copper, nickel, manganese, molybdenum, platinum, gold, silver, palladium, rhenium, rhodium, osmium, and iridium. The compound can be an oxide, sulfide, or other compound of the metal. A more preferred compound is manganese oxide ($MnO_2$).

The second catalyst for reforming the oxygenate is preferably a catalyst comprising at least one metal selected from chromium, gold, zinc, copper, platinum, silver, palladium, rhodium, rhenium, osmium, ruthenium, and iridium. The compound can be an oxide, sulfide, or other compound of the metal, with a more preferred compound comprising zinc oxide (ZnO).

The process comprises using the heat generated by the decomposition of the oxidizer to heat the oxygenate, water, and oxygen to facilitate reforming the oxygenate over a catalyst. The process may comprise the use of separate catalyst beds with a first catalyst bed holding the decomposition catalyst for the decomposition step, and a second catalyst bed for the reformation step. One embodiment using separate catalyst beds comprises flowing the mixture in a countercurrent method, wherein the mixture of oxygenate and oxidizer first flows over the first catalyst bed, and then reversed direction to flow over a second catalyst bed in thermal communication with the first catalyst bed. The catalyst beds may be disposed in an apparatus comprising an inner tube holding the second catalyst bed, and an outer tube holding the first catalyst bed and surrounding the inner tube.

In an alternative embodiment, the process flows the oxygenate and oxidizer concurrently over the first and second catalysts. The decomposition and reforming catalysts can be commingled in a single catalyst bed, where the catalysts are heated with the decomposition, and reformation occurs in the presence of the heated mixture, generating a reformate gas.

Optionally, the process includes a water-gas shift processing step. The water-gas shift processing step comprises flowing the reformate gas over a third catalyst in the presence of steam at an elevated temperature. The carbon monoxide and steam react to form hydrogen and carbon dioxide, as shown in equation 3.

$$CO + H_2O \xrightarrow{catalyst} CO_2 + H_2 \qquad (eqn. 3)$$

The third, or watergas shift catalyst comprises at least one metal selected from iron, cobalt, nickel, copper, zinc, yttrium, zirconium, niobium, molybdenum, technetium, ruthenium, rhodium, palladium, silver, cadmium, lanthanum, hafnium, tantalum, tungsten, rhenium, osmium, iridium, platinum, gold, and mercury. Preferably, the watergas shift is deposited on a support. Supports include inorganic oxides listed above, and the process for depositing a catalyst metal on a support are known to one skilled in the art.

The process may optionally include an oxidation step for the selective oxidation of carbon monoxide in the reformate gas stream to carbon dioxide. The oxidation step comprises flowing the hydrogen rich reformate gas over a fourth catalyst, wherein the fourth catalyst comprises at least one metal selected from ruthenium, platinum, gold, and palladium.

An aspect of the present invention is an apparatus for performing the process. The apparatus includes a housing for holding catalyst beds for the fuel to flow over. The housing has an inlet for admitting a feedstream, where the feedstream is a fuel comprising a mixture of at least one organic compound and at least one oxidizer. The apparatus includes a first catalyst bed having an inlet in fluid communication with the housing inlet, and an outlet for a first product stream. The first catalyst bed comprises a decomposition catalyst for decomposing the oxidizer and is as described above. The apparatus further includes a second catalyst bed having an inlet in fluid communication with the first catalyst bed outlet, and an outlet for a second product stream. The second catalyst bed comprises a reforming catalyst for reformulating the fuel and is as described above.

In one embodiment, the apparatus further comprises a third catalyst bed. The third catalyst bed includes a catalyst for performing the water gas shift reaction:

$$CO + H_2O \xrightarrow{catalyst} CO_2 + H_2$$

Suitable catalysts for the water gas shift reaction comprise at least one metal selected from iron, cobalt, nickel, copper, zinc, yttrium, zirconium, niobium, molybdenum, technetium, ruthenium, rhodium, palladium silver, cadmium, lanthanum, hafnium, tantalum, tungsten, rhenium, osmium, iridium, platinum, gold, and mercury. Preferably the catalyst comprises at least one metal selected from cobalt, iron, ruthenium, copper, and nickel. A preferred catalyst for the water gas shift reaction includes copper (Cu) and zinc oxide (ZnO).

Figure 3:
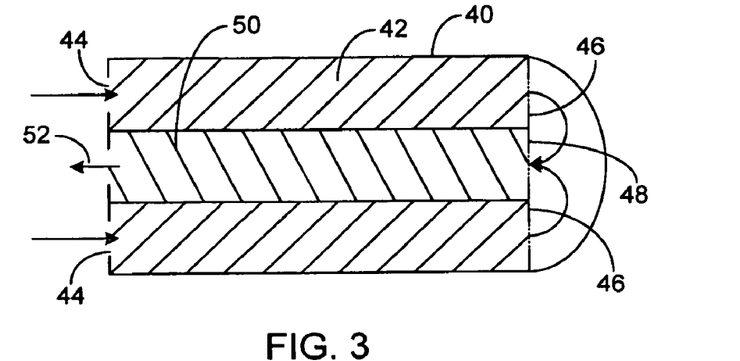
FIG. 3 is one embodiment of the apparatus for generating a hydrogen rich gas.

One embodiment of the present invention is an apparatus as shown in FIG. 3. The apparatus comprises a housing 40 having a cylindrical configuration. Inside the housing 40 a first catalyst bed 42 is disposed having a generally toroidal configuration. The fuel enters an inlet port 44 flows over the first catalyst bed 42, and exits a first bed outlet port 46. Thr first bed outlet port 46 in fluid communication with a second catalyst bed inlet port 48. The product stream from the first catalyst bed 42 flows over a second catalyst bed 50 and exits a second catalyst bed outlet port 52. The heat generated in the first catalyst bed 42 provides a heat source to the second catalyst bed 52 which is absorbed due to the endothermic reaction of the reforming reaction in the second catalyst bed 50.

Figure 4:
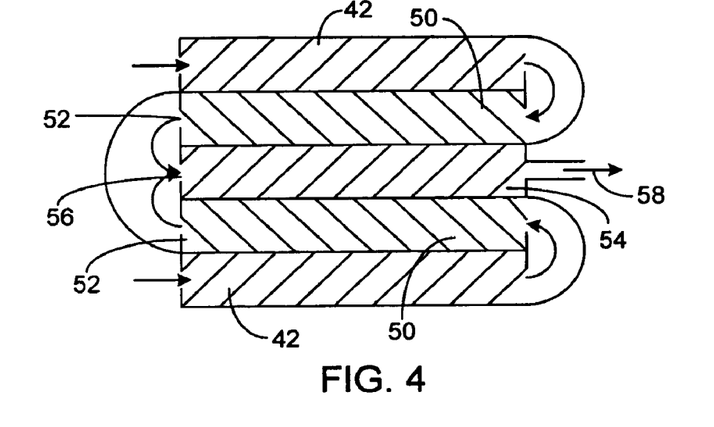
FIG. 4 is an alternate design of the apparatus for generating a hydrogen rich gas.

An alternate embodiment of the apparatus includes a third catalyst bed 54 as shown in FIG. 4. The third catalyst bed comprises a catalyst for performing the water gas shift reaction, wherein the second catalyst outlet port 52 is in fluid communication with the third catalyst bed inlet port 56. The product stream flows over the catalyst bed 54 and exits the third catalyst bed outlet port 58 with a hydrogen rich gas stream.

The invention is intended to include alternate configurations, including layering of the catalyst beds with fluid flow traversing back and forth through alternating beds. It is also intended to include, as an alternate embodiment, a commingling of the first and second catalyst beds to provide concurrent decomposition of the oxidizer and reformation of the alcohol, or other oxygenate.

Optional features that may be included in the design include heat conducting fins within the catalyst bed to facilitate heat transfer from one catalyst bed to another.

In an alternate embodiment, the present invention includes a housing for holding a catalyst bed, and having an inlet for admitting a feedstream and an outlet for delivering a product stream. The catalyst bed comprises a catalyst that is a mixture of catalysts for combining the process of decomposing the oxidizer and reformulating the organic compound using the energy generated by the decomposition of the oxidizer to drive the reformulation reaction.

Fuels are typically composed of a substantially pure component, or a mixture of components comprising individual constituents wherein each constituent can be a fuel, and wherein when the fuel is mixed with an oxidizing agent combustion occurs. Oxidizer and fuel are generally kept separate usually because the oxidizer is cheap, such as air, and does not need to be stored, and can be mixed with the fuel as needed. For example, in the case of the automobile internal combustion engine, the oxidizer (air) is mixed in a carburetor or in the fuel injector. Other circumstances that necessitate separation of oxidizer and fuel includes hypergolic fuels that combust upon contact with the oxidizer. A feature of the present invention is that the fuel and oxidizer are mixed for the production of $H_2$ and not for combustion and optionally the fuel and oxidizer are premixed and from a stable mixture.

Increasingly, specialized fuels are needed for specialized functions. An important aspect of a fuel is its ability to be readily stored and transported. For example, a fuel in a liquid form at standard environmental temperatures (−40° C. to 50° C.) is easily transported and stored. This provides for convenience of use with the delivery of the fuel to an appropriate device for using the fuel, such as an engine. A fuel that can be used to generate hydrogen as a single mixture provides considerable convenience for many purposes, such as, for example, supplemental hydrogen for petrochemical processes, hydrogen for PEM fuel cells, etc. It is preferred that the fuel be a pre-mixed composition having the necessary composition such that when passed over a catalyst generates a hydrogen rich gas. Preferably, the fuel is in a liquid state in the temperature range over which the fuel is normally exposed, and is comprised of chemicals having a relatively low toxicity.

Such a fuel, for use in hydrogen production instead of combustion, wherein the hydrogen is then consumed to generate power, is one that is a mixture of a organic compound and an oxidizer. The term fuel used hereinafter refers to a mixture of an organic compound and an oxidizer. A fuel suitable for the generation of hydrogen, when the fuel is mixed with an initiator, has an oxygenate concentration of at least 20 weight percent, and an oxidizer with a concentration of at least 15 weight percent. The fuel has hydrogen that is readily produced upon reformation, and has a hydrogen concentration of at least 5 weight percent. Preferably, the hydrogen concentration in the fuel is at least 7 weight percent, and more preferably at least 9 weight percent. In addition, the fuel has oxygen in the mixture with a concentration of at least 20 weight percent. Preferably, the oxygen concentration is greater than 40 weight percent, and more preferably greater than 50 weight percent.

In one preferred embodiment, the organic compound comprises an oxygenate. Suitable oxygenates are compounds that have a substantially liquid phase at normal environmental conditions, or are substantially soluble in an appropriate liquid at normal environmental conditions. Normal environmental conditions would be typically from about 0° C. to about 40° C., but could include temperatures as low as −40° C. and as high as about 65° C. Suitable oxygenates include, but are not limited to, alcohols, diols, triols, ethers, ketones, diketones, esters, carbonates, dicarbonates, oxalates, and carbohydrates such as sugars. Preferably, the oxygenates are selected from cheap chemicals such as methanol, ethanol, propanols and butanols. The oxygenates may also include mixtures of oxygenates. The oxygenate has a concentration from about 20 weight percent to about 91 weight percent of the fuel.

The fuel also comprises an oxidizer. Suitable oxidizers are either substantially liquid at normal environmental conditions, or remains in a substantially liquid phase when mixed with an appropriate liquid, such as an oxygenate, or water. Oxidizers that are suitable include, but are not limited to, hydrogen peroxide, organic peroxides, and hydroperoxides, with a preferred oxidizer being hydrogen peroxide. The oxidizer in the fuel has a concentration from about 20 weight percent to about 90 weight percent.

The oxygenate and oxidizer are mixed in a mass ratio from about 0.25 to about 9.8, and preferably from about 0.45 to about 4.0.

Optionally, the fuel includes a diluent, wherein the diluent is a compound that provides stability to the fuel when stored, and contributes to the production of hydrogen from the fuel when the fuel is processed to generate a hydrogen rich gas. A suitable diluent is water. Water provides stability to the mixture, as well as a source of hydrogen during a water-gas shift reaction.

The fuel may be further blended with appropriate organic compounds for controlling mixture properties, such as for example lowering mixture freezing points or raising mixture boiling points.

When the oxygenate comprises a solid, it is desirable that the oxygenate be soluble in the diluent or oxidizer so as to form a liquid solution. An example would be a sugar in a water and hydrogen peroxide solution.

As an example, ethanol was used as the preferred oxygenate, hydrogen peroxide as the oxidizer, and water as the diluent, computations were performed for determining the amount of hydrogen ($H_2$) produced. Table 4 lists the amount of hydrogen for varying composition of the three components.

TABLE 4

| Mass Fraction of Hydrogen Produced | | | | |
|---|---|---|---|---|
| Mass Flow Rate lb/hr | | | Mass Fraction $H_2$ Produced | |
| Water lb./hr. | Ethanol lb./hr. | Hydrogen Peroxide lb./hr. | Without Energy Recycle | With Energy Recycle |
| 10 | 40 | 33 | 0.0910 | 0.0954 |
| 10 | 40 | 34 | 0.0925 | 0.0956 |
| 10 | 40 | 35 | 0.0935 | 0.0945 |
| 10 | 40 | 36 | 0.0932 | 0.0933 |
| 10 | 40 | 37 | 0.0920 | 0.0920 |
| 15 | 25 | 22 | 0.0748 | 0.0751 |
| 15 | 25 | 23 | 0.0779 | 0.0797 |
| 15 | 25 | 24 | 0.0790 | 0.0795 |
| 15 | 25 | 25 | 0.0774 | 0.0774 |
| 15 | 25 | 26 | 0.0754 | 0.0754 |
| 23 | 5 | 10 | 0.0125 | — |
| 23 | 6 | 10 | 0.0130 | — |
| 23 | 7 | 10 | 0.0131 | — |
| 23 | 8 | 10 | 0.0131 | — |
| 23 | 9 | 10 | 0.0129 | — |

The results show that a diluent content can be substantial, and with a diluent content as high as 24 weight percent, a gas having at least 7 weight percent $H_2$ can be generated. The diluent has a concentration of less than about 40 weight percent. The amount of diluent will depend on the choice and relative ratios of oxygenate and oxidizer. The diluent can provide water for the reformation reaction, added stability to the fuel mixture, or other enhancements of selected physical properties, such as, for example, a fuel's boiling point.

In addition the diluent helps bring the fuel mixture to a value in a more stable range. Preferably, the concentration of oxygenate is in the range from about 30 weight percent to about 70 weight percent, and the oxidizer has a concentration in the range from about 30 weight percent to about 70 weight percent.

In an alternate embodiment, the organic compound comprises a hydrocarbon. The hydrocarbons are preferably paraffins. Suitable hydrocarbons include, but are not limited to methane, ethane, propanes, butanes, pentanes, hexanes, heptanes, octanes, nonanes, decanes, dodecanes, and mixtures thereof.

Preferably, the hydrocarbons have a substantially liquid phase, or are substantially soluble in a liquid phase at normal environmental conditions.

A comparison of hydrogen production of various organic compounds with hydrogen peroxide as the oxidizer water as a diluent are listed in Tables 5 and 6. In addition to hydrocarbons, and alcohols, other compounds are possible, including sugars (glucose) dissolved in a solution of water and hydrogen peroxide.

TABLE 5

Comparison of organic compounds properties.

| | | H Content wt. % | Steam reformability at 90% | | | | L or V + Pressure to Liquify (psi) | Toxicity | |
|---|---|---|---|---|---|---|---|---|---|
| | Formula | | Temperature °C. | Mole Ratio water:fuel | Contact Time or GHSV | Catalyst | | LD50 (mg/kg) Oral-Rat | LC50 (mg/liter) Inhalation-Rat |
| Methanol | $CH_3OH$ | 12.58 | 280 | 1.8:1 | 300 msec | Unavailable | L | 5628 | |
| Ethanol | $C_2H_5OH$ | 13.13 | 615 | 13:1 | 5000/hour | $V_2O_5$ | L | 7060 | |
| Isopropanol | $C_3H_7OH$ | 13.42 | | | | | L | 5045 | |
| Butanol | $C_4H_9OH$ | 13.60 | | | | | L | 790 | |
| Methane | $CH_4$ | 25.13 | 790 | 1.1:1 | 27600/hour | NiO-CaO | V, >10000 | | >5 |
| Ethane | $C_2H_6$ | 20.11 | | | | | V, 610.9 | | |
| Propane | $C_3H_8$ | 18.29 | 600 | 3:1 | 1000/hour | Pt-Sn | V, 139.0 | | |
| Butane | $C_4H_{10}$ | 17.34 | 660 | 3:1 | 10 msec | Unavailable | V, 35.2 | | 658 for 4 hours |
| Pentane | $C_5H_{12}$ | 16.76 | | | | | L | >2000 | |
| Hexane | $C_6H_{14}$ | 16.37 | | | | | L | 28710 | |
| Dodecane | $C_{12}H_{26}$ | 15.38 | | | | | L | | |
| Dimethylether | $C_2H_6O$ | 13.13 | | | | | L | | |
| Isopropylether | $C_6H_{14}O$ | 13.81 | | | | | L | 8470 | |
| Dimethoxymethane | $C_3H_8O_2$ | 10.60 | | | | | L | | |
| Glucose | $C_6H_{12}O_6$ | 6.71 | 630 | 93:1 | 30 sec | Unavailable | L | 25800 | |
| Sorbitol | $C_6H_{14}O_6$ | 7.75 | | | | | L | 15900 | |

TABLE 6

Comparison of organic compounds $H_2$ content of gas produced.

| | Formula | H Content wt. % | Renewable | Mass Flow Rate lb/hr | | | H Content after reaction (wt %) | Temperature °C. | Fuel Conversion |
|---|---|---|---|---|---|---|---|---|---|
| | | | | Water | $H_2O_2$ | Fuel | | | |
| Methanol | $CH_3OH$ | 12.58 | Y/N | 0.0 | 1.0 | 2.15 | 10.11 | 339.7 | 98.7 |
| Ethanol | $C_2H_5OH$ | 13.13 | Y | 0.0 | 1.0 | 1.16 | 9.66 | 645.5 | 99.7 |
| Isopropanol | $C_3H_7OH$ | 13.42 | N | 0.02 | 1.0 | 0.94 | 9.46 | 704.1 | 99.7 |
| Butanol | $C_4H_9OH$ | 13.60 | N | 0.02 | 1.0 | 0.88 | 9.46 | 705.6 | 99.8 |
| Methane | $CH_4$ | 25.13 | Y/N | 0.02 | 1.0 | 0.47 | 10.80 | 1289.5 | 97.7 |
| Ethane | $C_2H_6$ | 20.11 | N | 0.02 | 1.0 | 0.55 | 10.81 | 1047.4 | 99.7 |
| Propane | $C_3H_8$ | 18.29 | N | 0.02 | 1.0 | 0.58 | 10.39 | 961.7 | 99.9 |
| Butane | $C_4H_{10}$ | 17.34 | N | 0.02 | 1.0 | 0.60 | 10.12 | 902.3 | 99.6 |
| Pentane | $C_5H_{12}$ | 16.76 | N | 0.02 | 1.0 | 0.61 | 9.97 | 879.0 | 99.7 |
| Hexane | $C_6H_{14}$ | 16.37 | N | 0.02 | 1.0 | 0.60 | 9.79 | 856.0 | 99.8 |
| Dodecane | $C_{12}H_{26}$ | 15.38 | N | 0.02 | 1.0 | 0.61 | 9.49 | 829.7 | 100.0 |
| Dimethylether | $C_2H_6O$ | 13.13 | N | 0.02 | 1.0 | 1.66 | 10.37 | 465.8 | 99.6 |
| Isopropylether | $C_6H_{14}O$ | 13.81 | N | 0.02 | 1.0 | 0.82 | 9.44 | 697.0 | 99.8 |
| Dimethoxymethane | $C_3H_8O_2$ | 10.60 | Y/N | — | — | — | — | — | — |
| Glucose | $C_6H_{12}O_6$ | 6.71 | Y | — | — | — | — | — | — |
| Sorbitol | $C_6H_{14}O_6$ | 7.75 | Y | 0.02 | 1.0 | 2.31 | 7.08 | 267.0 | 100.0 |

What is claimed is:

1. A process for the generation of an $H_2$ containing gas comprising contacting a liquid organic compound and a liquid oxidizer in the presence of an initiator at ambient pressure to produce the $H_2$ containing gas.

2. The process of claim 1 wherein the initiator is selected from the group consisting of catalysts, chemical initiators and heat.

3. The process of claim 1 wherein the organic compound is an oxygenate.

4. The process of claim 1 wherein the oxidizer is selected from the group consisting of hydrogen peroxide, organic peroxides, hydroperoxides, and mixtures thereof.

5. The process of claim 4 wherein the oxidizer is hydrogen peroxide.

6. The process of claim 3 wherein the oxygenate is selected from the group consisting of alcohols, diols, triols, ethers, ketones, diketones, esters, sugars, and mixtures thereof.

7. The process of claim 6 wherein the oxygenate is selected from the group consisting of alcohols having 12 or fewer carbons, ketones having 12 or fewer carbons, esters having 12 or fewer carbons, diols having 12 or fewer carbons, triols having 12 or fewer carbons, ethers having 12 or fewer carbons, organic acids having 12 or fewer carbons, sugars having 12 carbons or less, and mixtures thereof.

8. The process of claim 7 wherein the oxygenate is selected from the group consisting of methanol, ethanol, n-propanol, isopropanol, 1-butanol, 2-butanol, tert-butanol, 1-pentanol, 2-pentanol, 3-pentanol, tert-amyl alcohol, 1-hexanol, 2-hexanol, 3-hexanol, dimethylether, diethylether, isopropylether, methyl tert-butyl ether, methyl tert-amyl ether, glucose, sorbitol, and mixtures thereof.

9. The process of claim 8 wherein the oxygenate is methanol.

10. The process of claim 8 wherein the oxygenate is ethanol.

11. The process of claim 2 wherein the catalyst comprises a metal selected from the group consisting of Ca, Sc, Ti, V, Cr, Mn, Fe, Co, Ni, Cu, Zn, Sr, Y, Zr, Nb, Mo, Tc, Ru, Rh, Pd, Ag, Cd, Ba, La, Hf, Ta, W, Re, Os, Ir, Pt, Au, Hg, and mixtures thereof.

12. The process of claim 11 wherein the metal is dispersed on a support.

13. The process of claim 12 wherein the support is an inorganic oxide selected from the group consisting of silicas, aluminas, titania, zirconia, yttria, carbon, silicon carbide, diatomaceous earth, clay, molecular sieves, and mixtures thereof.

14. The process of claim 11 wherein the catalyst comprises a metal selected from the group consisting of Mn, Fe, V, Pt, Pd, Rh, Re, Os, Ru, Ir, Co, Cu, Ni, Mo, Au, Ag and mixtures thereof.

15. The process of claim 1 wherein the oxidizer is an aqueous solution comprising hydrogen peroxide concentration between about 10 weight percent and about 90 weight percent.

16. The process of claim 1 wherein the oxygenate and oxidizer are mixed in a mass ratio between about 0.25 and about 9.75.

17. The process of claim 16 wherein the oxygenate and hydrogen peroxide are mixed in a mass ratio between about 0.7 and about 3.

18. The process of claim 1 wherein the gas having a hydrogen content greater than 5 weight percent.

19. The process of claim 1 where the oxidizer further comprises a diluent.

20. The process of claim 2 wherein the catalyst comprises a decomposition catalyst for oxidizer decomposition and a reforming catalyst for reforming of the oxygenate.

21. The process of claim 20 wherein the decomposition and reforming catalysts are in separate catalyst beds.

22. The process of claim 20 wherein the decomposition and reforming catalysts comprise a mixture in a catalyst bed.

23. The process of claim 20 further comprising a watergas shift catalyst.

24. The process of claim 23 further comprising an oxidation catalyst for the conversion of CO to $CO_2$.

25. The process of claim 20 wherein the decomposition catalyst comprises a transition metal selected from the group consisting of V, Fe, Co, Ru, Cu, Ni, Mn, Mo, Pt, Au, Ag, Pd, Rh, Re, Os, Ir, and mixtures thereof.

26. The process of claim 25 wherein the decomposition catalyst comprises $MnO_2$.

27. The process of claim 20 wherein the reforming catalyst comprises a transition metal selected from the group consisting of Cr, Au, Zn, Cu, Pt, Ag, Pd, Rh, Re, Os, Ru, Ir, and mixtures thereof.

28. The process of claim 27 wherein the catalyst comprises ZnO.

29. The process of claim 20 wherein the catalyst mixture comprises a ratio of the decomposition catalyst to the reforming catalyst in the range from about 0.1 to about 10.0.

30. The process of claim 23 wherein the watergas shift catalyst comprises at least one metal selected from the group consisting of Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, and mixtures thereof.

31. The process of claim 30 wherein the watergas shift catalyst comprises Cu and ZnO.

32. The process of claim 24 wherein the oxidation catalyst comprises a metal selected from the group consisting of Ru, Pt, Au, and mixtures thereof.

33. The process of claim 1 further comprising the step of purifying the hydrogen containing gas.

34. The process of claim 1 further comprising mixing the oxygenate and oxidizer prior to the step of mixing the mixture of oxygenate and oxidizer with an initiator.

35. A process for the production of hydrogen comprising the steps of:

mixing an alcohol and hydrogen peroxide in the presence of a decomposition catalyst at ambient pressure, wherein a gaseous product comprising hydrogen and carbon monoxide is produced and the decomposition catalyst is at least one metal selected from the group consisting of Ca, Sc, Ti, V, Cr, Mn, Fe, Co, Ni, Cu, Zn, Sr, Y, Zr, Nb, Mo, Tc, Ru, Rh, Pd, Ag, Cd, Ba, La, Hf, Ta, W, Re, Os, Ir, Pt, Au, Hg, Sn, and mixtures thereof; and passing the product gas over a reforming catalyst, wherein a product comprising hydrogen and carbon dioxide is produced and the reforming catalyst is at least one metal selected from the group consisting of Cr, Au, Zn, Cu, Pt, Ag, Pd, Rh, Re, Os, Ru, Ir, and mixtures thereof.

36. The process of claim 35 wherein the alcohol is selected from the group consisting of methanol, ethanol, isopropanol, n-propanol, butanol, and mixtures thereof.

37. The process of claim 35 further comprising mixing oxygen with the product in the presence of a an oxidizing catalyst for selective oxidation of the carbon monoxide, wherein the catalyst is selected from the group consisting of Fe, Co, Ni, Cu, Zn, Y, Zr, Nb, Mo, Tc, Ru, Rh, Pd, Ag, Cd, La, Hf, Ta, W, Re, Os, Ir, Pt, Ru, Au, Hg, and mixtures thereof.

38. The process of claim 35 further comprising the step of premixing the alcohol and hydrogen peroxide prior to mixing with the first catalyst.

* * * * *